United States Patent
Zhuang et al.

(10) Patent No.: US 12,258,522 B2
(45) Date of Patent: Mar. 25, 2025

(54) DIRECT CONTACT PROCESS AND METHOD FOR PRODUCING HOT WATER USING MATURE FINE TAILINGS (MFT)

(71) Applicant: HER MAJESTY THE QUEEN IN RIGHT OF CANADA AS REPRESENTED BY THE MINISTER OF NATURAL RESOURCES, Ottawa (CA)

(72) Inventors: Quan Zhuang, Ottawa (CA); Phil Geddis, Ottawa (CA); Bruce Clements, Ottawa (CA); Brianna Hataley, Ottawa (CA); Mohammad Asiri, McNab/Braeside (CA); Ted Herage, Stittsville (CA); Steven Chen, Ottawa (CA); Lijun Wu, Ottawa (CA)

(73) Assignee: HER MAJESTY THE QUEEN IN RIGHT OF CANADA AS REPRESENTED BY THE MINISTER OF NATURAL RESOURCES, Ottawa (CA)

( * ) Notice: Subject to any disclaimer, the term of this patent is extended or adjusted under 35 U.S.C. 154(b) by 179 days.

(21) Appl. No.: 17/964,146

(22) Filed: Oct. 12, 2022

(65) Prior Publication Data

US 2023/0115790 A1    Apr. 13, 2023

Related U.S. Application Data

(60) Provisional application No. 63/262,401, filed on Oct. 12, 2021.

(51) Int. Cl.
*B01D 1/14* (2006.01)
*B01D 5/00* (2006.01)
(Continued)

(52) U.S. Cl.
CPC ............ *C10C 3/002* (2013.01); *B01D 1/14* (2013.01); *B01D 5/006* (2013.01); *B03B 9/02* (2013.01);
(Continued)

(58) Field of Classification Search
CPC .......... E21B 43/34; E21B 43/35; E21B 43/40; E21B 21/063–067; E21B 21/06–067; B03B 9/02; C02F 1/04–18; C10G 1/045
See application file for complete search history.

(56) References Cited

U.S. PATENT DOCUMENTS

3,174,820 A * 3/1965 See ........................ B01D 1/14
422/198
8,424,601 B2 * 4/2013 Betzer-Zilevitch ........................
B03D 1/1475
166/272.3
(Continued)

*Primary Examiner* — Jonathan Luke Pilcher
(74) *Attorney, Agent, or Firm* — Hoffman Warnick LLC (57) ABSTRACT

The present invention discloses systems and methods for supplying hot water for primary extraction in the oil sands bitumen extraction process. Direct contact process and method for producing hot water using mature fine tailings are provided by employing a double staged submerge arrangement with a thickener vessel containing a submerged fuel burner and a hot water vessel containing a submerged fuel burner, a flash submerged arrangement with a flash concentrator vessel containing or adjacent to a fuel burner and a hot water vessel containing a submerged fuel burner or a triple cascade arrangement with a flash concentrator vessel, a thickener vessel containing a submerged fuel burner and a hot water vessel containing a submerged fuel burner.

20 Claims, 5 Drawing Sheets

(51) Int. Cl.
    *B03B 9/02*     (2006.01)
    *C02F 1/04*     (2023.01)
    *C02F 1/10*     (2023.01)
    *C10C 3/00*     (2006.01)
    *E21B 21/06*     (2006.01)
    *E21B 43/40*     (2006.01)
    *C02F 103/10*     (2006.01)
    *C02F 103/36*     (2006.01)

(52) U.S. Cl.
    CPC ............... *C02F 1/048* (2013.01); *C02F 1/10* (2013.01); *E21B 21/065* (2013.01); *E21B 43/40* (2013.01); *C02F 2103/10* (2013.01); *C02F 2103/365* (2013.01)

(56) References Cited

U.S. PATENT DOCUMENTS

| | | | | |
|---|---|---|---|---|
| 8,789,608 | B2 * | 7/2014 | Betzer-Zilevitch | ..... E21B 43/35 |
| | | | | 122/6 R |
| 9,114,406 | B2 * | 8/2015 | Betzer Tsilevich | ..... E21B 43/24 |
| 2010/0147516 | A1 * | 6/2010 | Betzer-Zilevitch | ...... B03D 1/02 |
| | | | | 166/272.6 |
| 2010/0170453 | A1 * | 7/2010 | Betzer-Zilevitch | ..... E21B 43/40 |
| | | | | 122/6 R |
| 2012/0000642 | A1 * | 1/2012 | Betzer Tsilevich | ... E21B 43/241 |
| | | | | 166/57 |
| 2021/0154592 | A1 * | 5/2021 | Fried | ....... C02F 11/13 |

* cited by examiner

DIRECT CONTACT PROCESS AND METHOD FOR PRODUCING HOT WATER USING MATURE FINE TAILINGS (MFT)

FIELD OF THE INVENTION

The present invention relates to an improved method for supplying hot water for primary extraction in the oil sands bitumen extraction process using tailings.

BACKGROUND OF THE INVENTION

Oil sands deposits are mostly bitumen, which is the thickest type of oil deposit. Because bitumen is contained in a sand deposit, there are further complications of its extraction and production. For these reasons, the amount of processing required is much more than other resources which are not oil sands. Addressing these challenges requires continually improving technology to improve the production methods.

Oil sands extraction emits more Green House Gas (GHGs) than most other resources which produce the same quantity of conventional crude. It also depletes and pollutes freshwater resources and creates giant tailings ponds.

The environmental concerns related to oil sands extraction which need to be addressed are as follows:
- reduce greenhouse gas emissions,
- reduce criteria air contaminants (CACs) such as NOx, $SO_2$, CO, hydrocarbons, etc.,
- reduce tailings and reduce the size of the tailings ponds,
- produce dry/drier tailings,
- reduce fresh water usage, and
- reduce land use and minimize impact on boreal forest.

These environmental concerns need to be addressed while keeping the oil sands resource economically competitive.

Oil sands deposits are produced either using a mined bitumen approach for near surface deposits, or an in-situ extraction method such as steam assisted gravity drainage (SAGD) or cyclic steam stimulation (CSS). Tailings and tailings ponds are an aspect of a mined bitumen process as detailed below.

Typically, mined oil sands contain about 8-13% bitumen, the remainder is silica sand (up to 60%), fine solids (<30%) and no more than 5% water.

As the ore is processed through the bitumen production, large volumes of process (hot) water are added to produce a slurry that can be gravity separated, recovering the bitumen and leaving the coarse silica sand, fine solids and process water behind. Tailings produced in extraction and froth treatment normally contain about 50% water. These tailings streams are pumped out to the tailings pond, where the solids settle to the bottom of the pond and clarified water is pumped back to the main processing plant. The recovered water provides over 80% of the facility's process water needs. The tailings ponds are massive structures, since they need to provide sufficient residence time for recovery of water and adequate holding capacity for all the solids contained in the mined ore. As more tailings get deposited, water level rises and the tailings dam gets higher. Water must be continually pumped out in order to prevent the water level from getting too high.

The oil sands deposit naturally contains a significant amount of fines, ranging from 10-30% depending on the deposit geology. Fines comprised mostly of clay and silt material. As tailings are poured into the pond, coarse sand sinks to the bottom, trapping up to 30% of the fines. These fines are trapped within the voids of the coarse tailings stream, which is mostly silica sand. The remaining fines are suspended in the tailings pond water and have a tendency to form a sludge-like substance called fine fluid tailings (FFT). If left unprocessed for several years, this layer of fines eventually degrades into mature fine tailings (MFT). If left untreated, it can take up to 150 years for tailings to fully dewater and settle out the mature fine tailings.

The present invention relates to the mined bitumen process as opposed to in-situ extraction methods.

In an oil sands mined bitumen extraction plant, large amounts of hot process water are required for bitumen extraction from oil sands. The process water is required to be relatively clean and is generally drawn from the top water of the tailings pond, called pond effluent water or "PEW". Boilers produce steam in utility plants using relatively pure utility water supplemented by fresh water. This steam flows into a heat exchanger and indirectly heats the process water (mostly pond effluent water) to a temperature suitable for the primary extraction of bitumen from oil sand.

Figure 1:
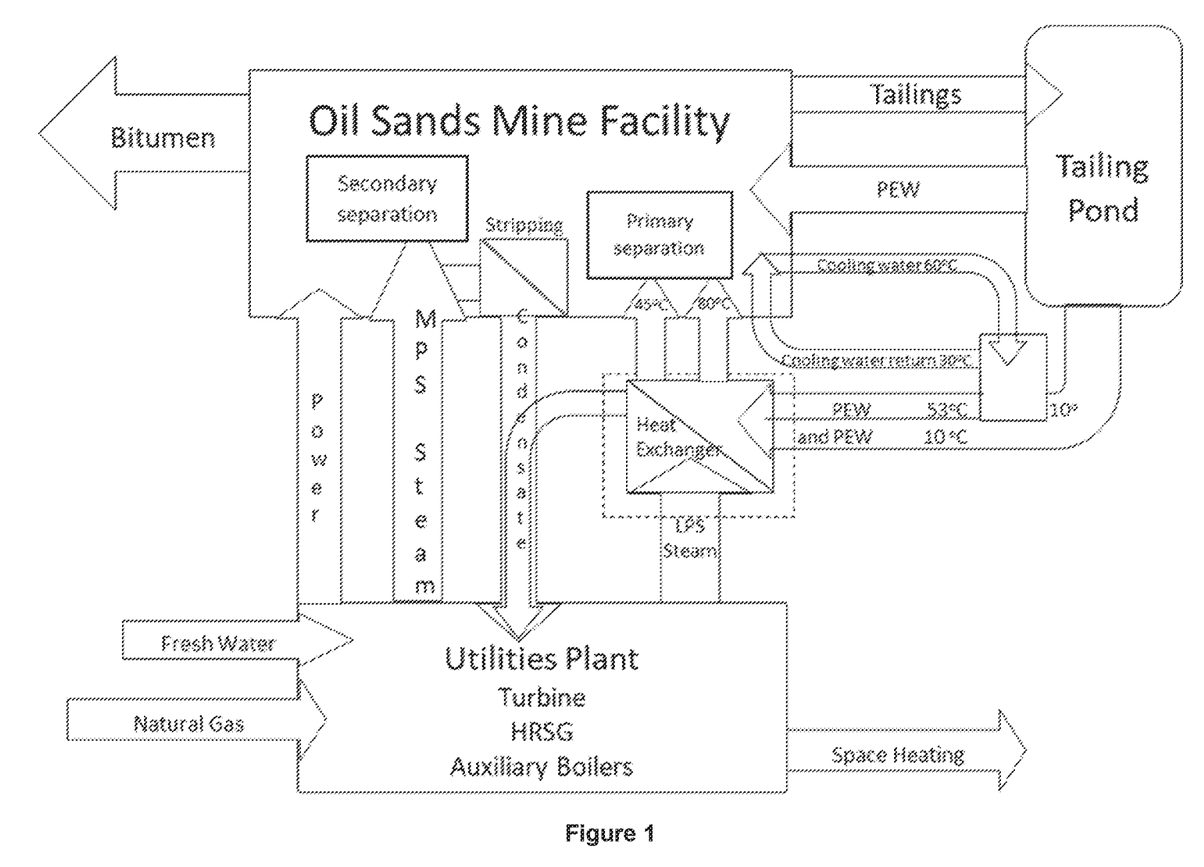
FIG. 1 is a schematic representation of an embodiment of a conventional process of oil sands bitumen extraction (prior art).

FIG. 1 is a schematic representation of an embodiment of a conventional process of oil sands bitumen extraction (prior art).

The oil sands mining facility consists of:
- Mining ore preparation
- Primary separation (hot water separation)
- Secondary separation (using either napthenic or paraffinic solvent)
- Tailings preparation
- Tailings pond In FIG. 1, there is a circuit that shows the process water drawn as pond effluent water from the tailings pond surface. The pond effluent water is heated to two different levels within the heat exchanger (approximately 45° C. and 80° C. respectively). This hot process water will enter the primary separation operation to free bitumen from oil sand. It then exits to the tailings pond where some of it may settle.

Referring to FIG. 1, the utilities plant takes in fresh water and some pond effluent water to produce space heat, power and both medium pressure steam (MPS) and low pressure steam (LPS). Equipment within the utilities plant usually consists of a cogeneration system with a turbine to produce power and a heat recovery steam generator (HRSG) producing steam. Steam is also produced in various auxiliary boilers of differing configurations, each having different feedwater requirements.

FIG. 1 also shows the steam circuit. The medium pressure steam is mostly used for the secondary separation of bitumen; however, the low pressure steam is used to generate hot water for the primary separation. The low pressure steam goes to heat exchanger (shown in the dashed box) to heat the process water. Condensate from the heat exchanger and the secondary stripping return to the utilities plant for re-use.

Tailings ponds are problematic and a huge environmental concern. They build up over time and there are few approaches that can properly reduce their size.

The tailings pond consists of a top layer called pond effluent water that has fewer hydrocarbons and solids and as such it can be reused in the process. The middle layer of mature fine tailings stays in suspension for many years. As a result, mature fine tailings gather over time and cannot be properly managed with the current technology.

The present invention relates mostly to primary separations and the tailings ponds.

According to the current existing technology, hot water is currently produced using an indirect contact method consisting of steam boilers and steam-water heat exchangers, both having dense steel tube banks. The drawback of the current technology is that it requires using high quality water, resulting in high energy and moisture loss in boiler flue gas when firing natural gas. Thus, the energy efficiency is low and the system cost is high. The plant generates large amounts of waste water when medium pressure steam cannot be recycled, therefore increasing environmental issues.

Therefore, there remains the need for improving the energy efficiency and reducing the cost of equipment in the production of hot water in oil sand mined bitumen extraction.

SUMMARY OF THE INVENTION

The process disclosed in the present invention uses a new hot water technology capable of using fuel and a high fraction of the mature fine tailings from the tailing pond, which are not usable with current technology due to their high solid content, while producing dry tailings from this material.

Fuel is a solid, liquid or gaseous hydrocarbon, hydrogen, or a mixture thereof.

According to one aspect of the invention, there is provided a system for producing water for primary extraction in oil sands bitumen extraction process using mature fine tailings, the system comprises:
  a thickener vessel,
  wherein mature fine tailings are pumped into the thickener vessel from a tailing pond to form a mature fine tailings bath within the thickener vessel,
  a first fuel burner submerged in the thickener vessel,
  wherein fuel is introduced into the first fuel burner and through combustion produces a flue gas, the flue gas comes out the first fuel burner and bubbles through the mature fine tailings bath to evaporate water from within the mature fine tailings in the thickener vessel in a direct contact mode,
  wherein the flue gas becomes a flue gas/steam coming out from the thickener vessel,
  wherein the resulted more concentrated mature fine tailings in the thickener vessel are discharged for further processing or disposal,
  a hot water vessel,
  a second fuel burner submerged within the hot water vessel,
  wherein the second fuel burner is used to heat pond effluent water fed in from the tailing pond, and
  wherein moisture in the flue gas/steam coming out from the thickener vessel is fed into the hot water vessel to condense to recover liquid and recover latent heat in heating the pond effluent water.

According to another aspect of the invention, there is provided a method for producing water from primary extraction in oil sands bitumen extraction process using mature fine tailings, the method comprises the steps of:
  pumping mature fine tailings from a tailing pond into a thickener vessel to form a mature fine tailings bath within the thickener vessel,
  introducing fuel into a first fuel burner submerged in the thickener vessel and through combustion producing a flue gas,
  evaporating water from within the mature fine tailings in the thickener vessel in a direct contact mode using the flue gas coming out the first fuel burner and bubbling through the mature fine tailings bath, wherein the flue gas becomes a flue gas/steam coming out from the thickener vessel,
  discharging the resulted more concentrated mature fine tailings in the thickener vessel for further processing or disposal,
  heating pond effluent water fed in from the tailing pond in a hot water vessel by a second fuel burner submerged within the hot water vessel, and
  condensing moisture in the flue gas/steam coming out from the thickener vessel and fed into the hot water vessel to recover liquid and recovering latent heat in heating the pond effluent water.

According to one embodiment of the invention, the thickener vessel as the mature fine tailings bath is heated by the first fuel burner, bitumen contained in the mature fine tailings floats to the top of the mature fine tailings bath, the floated bitumen can be skimmed, the remaining water is reintroduced into the hot water vessel.

According to one embodiment of the invention, the mature fine tailings fed into the thickener vessel have approximately 30% solids at 25° C.

According to one embodiment of the invention, the fuel burners are fired with air combustion or oxy-combustion.

According to one aspect of the invention, there is provided a system for producing water from primary extraction in oil sands bitumen extraction process using mature fine tailings, the system comprises:
  a flash concentrator vessel,
  wherein mature fine tailings are pumped and sprayed into the flash concentrator vessel,
  a first fuel burner located in proximity to the flash concentrator vessel to heat the mature fine tailings sprayed into the flash concentrator vessel,
  wherein fuel is introduced into the first fuel burner and through combustion produces a flue gas,
  wherein the flue gas becomes a flue gas/steam coming out from the flash concentrator vessel,
  wherein the resulted more concentrated mature fine tailings in the flash concentrator vessel are discharged for further processing or disposal,
  a hot water vessel,
  a second fuel burner submerged within the hot water vessel,
  wherein the second fuel burner is used to heat pond effluent water fed in from the tailing pond, and
  wherein moisture in the flue gas/steam coming out from the flash concentrator vessel is fed into the hot water vessel to condense to liquid and recover latent heat in heating the pond effluent water.

According to another aspect of the invention, there is provided a method for producing water from primary extraction in oil sands bitumen extraction process using mature fine tailings, the method comprises the steps of:
  pumping and spraying mature fine tailings from a tailing pond into a flash concentrator vessel,
  introducing fuel into a first fuel burner located in proximity to the flash concentrator vessel and through combustion producing a flue gas and heat the mature fine tailings sprayed into the flash concentrator vessel, wherein the flue gas becomes a flue gas/steam coming out from the flash concentrator vessel,
  discharging the resulted more concentrated mature fine tailings in the flash concentrator vessel for further processing or disposal,
  heating pond effluent water fed in from the tailing pond in a hot water vessel by a second fuel burner submerged within the hot water vessel, and
  condensing moisture in the flue gas/steam coming out from the flash concentrator vessel and fed into the hot water vessel to recover liquid and recovering latent heat in heating the pond effluent water.

According to one embodiment of the invention, a baffle is used to divide the flash concentrator vessel to minimize the flue gas to short circuit the system.

According to one embodiment of the invention, a plurality of nozzles is installed in or near top of the flash concentrator vessel to spray the mature fine tailings into the flash concentrator vessel.

According to one embodiment of the invention, the flue gas resulted from the first fuel burner is kept over approximately 650° C.

According to one embodiment of the invention, the flash concentrator vessel is elevated to allow for a disposal vehicle to be loaded beneath it.

According to one embodiment of the invention, a dust collecting cyclone is installed in between the flash concentrator vessel and the hot water vessel.

According to one embodiment of the invention, the mature fine tailings fed into the thickener vessel have approximately 30% solids at 25° C.

According to one embodiment of the invention, the fuel burners are fired with air combustion or oxy-combustion.

According to one aspect of the invention, there is provided a system for producing water for primary extraction in oil sands bitumen extraction process using mature fine tailings, the system comprises:
  a thickener vessel,
  wherein mature fine tailings are pumped into the thickener vessel from a tailing pond to form a mature fine tailings bath within the thickener vessel,
  a first fuel burner submerged in the thickener vessel,
  wherein fuel is introduced into the first fuel burner and through combustion produces a first flue gas, the first flue gas comes out the first fuel burner and bubbles through the mature fine tailings bath to evaporate water from within the mature fine tailings in a direct contact mode,
  wherein the first flue gas becomes a first flue gas/steam coming out from the thickener vessel,
  a hot water vessel,
  a second fuel burner submerged within the hot water vessel,
  wherein the second fuel burner is used to heat pond effluent water fed in from the tailing pond, and
  wherein moisture in the first flue gas/steam coming out from the thickener vessel is fed into the hot water vessel to condense to recover liquid and recover latent heat in heating the pond effluent water,
  wherein the resulted first more concentrated mature fine tailings from the thickener vessel are pumped and sprayed into the flash concentrator vessel,
  a third fuel burner located in proximity to the flash concentrator vessel to heat the more concentrated mature fine tailings,
  wherein fuel is introduced into the third fuel burner and through combustion produces a second flue gas,
  wherein the second flue gas becomes a second flue gas/steam coming out from the flash concentrator vessel,
  wherein the second flue gas/steam coming out from the flash concentrator vessel is fed into the thickener vessel and bubbled through the mature fine tailings bath,
  wherein the resulted second more concentrated mature fine tailings in the flash concentrator vessel are discharged for further processing or disposal.

According to another aspect of the invention, there is provided a method for producing water for primary extraction in oil sands bitumen extraction process using mature fine tailings, the method comprises the steps of:
  pumping mature fine tailings from a tailing pond into a thickener vessel to form a mature fine tailings bath within the thickener vessel,
  introducing fuel into a first fuel burner submerged in the thickener vessel and through combustion producing a first flue gas,
  evaporating water from within the mature fine tailings in the thickener vessel in a direct contact mode using the first flue gas coming out the first fuel burner and bubbling through the mature fine tailings bath, wherein the first flue gas becomes a flue gas/steam coming out from the thickener vessel,
  heating pond effluent water fed in from the tailing pond in a hot water vessel by a second fuel burner submerged within the hot water vessel,
  condensing moisture in the first flue gas/steam coming out from the thickener vessel and fed into the hot water vessel to recover liquid and recovering latent heat in heating the pond effluent water,
  pumping and spraying the resulted first more concentrated mature fine tailings in the thickener vessel into a flash concentrator vessel,
  introducing fuel into a third fuel burner located in proximity to the flash concentrator vessel and through combustion producing a second flue gas and heat the resulted first more concentrated mature fine tailings in the thickener vessel pumped and sprayed into the flash concentrator vessel, wherein the second flue gas becomes a second flue gas/steam coming out from the flash concentrator vessel,
  discharging the resulted second more concentrated mature fine tailings in the flash concentrator vessel for further processing or disposal, and
  feeding the second flue gas/steam coming out from the flash concentrator vessel into the thickener vessel and bubbling through the mature fine tailings bath the thickener vessel.

According to one embodiment of the invention, a baffle is used to divide the flash concentrator vessel to minimize the flue gas to short circuit the system.

According to one embodiment of the invention, the flue gas resulted from the third fuel burner is kept over approximately 650° C.

According to one embodiment of the invention, wherein the flash concentrator vessel is elevated to allow for a disposal vehicle to be loaded beneath it.

According to one embodiment of the invention, a dust collecting cyclone is installed in between the flash concentrator vessel and the hot water vessel.

According to one embodiment of the invention, in the thickener vessel as the mature fine tailings bath is heated by the first fuel burner, bitumen contained in the mature fine tailings floats to the top of the mature fine tailings bath, the floated bitumen can be skimmed the remaining water is reintroduced into the hot water vessel.

According to one embodiment of the invention, the mature fine tailings fed into the thickener vessel have approximately 30% solids, though this percentage could be higher or lower, and are at a temperature that keeps them flowable.

According to one embodiment of the invention, the fuel burners are fired with air combustion or oxy-combustion.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

DETAILED DESCRIPTION OF THE INVENTION

It is to be understood that the disclosure is not limited in its application to the details of the embodiments as set forth in the following description. The invention is capable of other embodiments and of being practiced or of being carried out in various ways. By way of example only, preferred embodiments of the present invention are described hereinafter with reference to the accompanying drawings.

Furthermore, it is to be understood that the terminology used herein is for the purpose of description and should not be regarded as limiting. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more". Any numerical range recited herein is intended to include all values from the lower value to the upper value of that range.

The present invention focuses on replacing the production of hot water shown in the hatched box in FIG. 1 with an improved process designed to overcome some of the problems associated with the existing technology.

The present invention provides many benefits, inter alia, it:
  reduces green house gas emission,
  reduces criteria air contaminants generated,
  uses mature fine tailings thereby allowing the drainage of the tailings pond while producing a dry tailing material suitable of terrestrial sequestration and with near zero fresh water requirements,
  provides a pathway to a near zero green house gas emission approach,
  allows for the recovery of extra bitumen currently contained within mature fine tailings,
  improves energy efficiency by using direct contact approaches, and
  replaces high capital cost items (boilers and heat exchangers) with more economical equipment thereby improving the economics.

The present invention is an improved method for supplying hot water for primary extraction in a more economic and environmentally sustainable manner than what is used in the current practice.

The method disclosed in the present invention has the advantage of using mature fine tailings to achieve the results, thus depleting the use of tailings ponds which are massive structures that require high maintenance.

Figure 2:
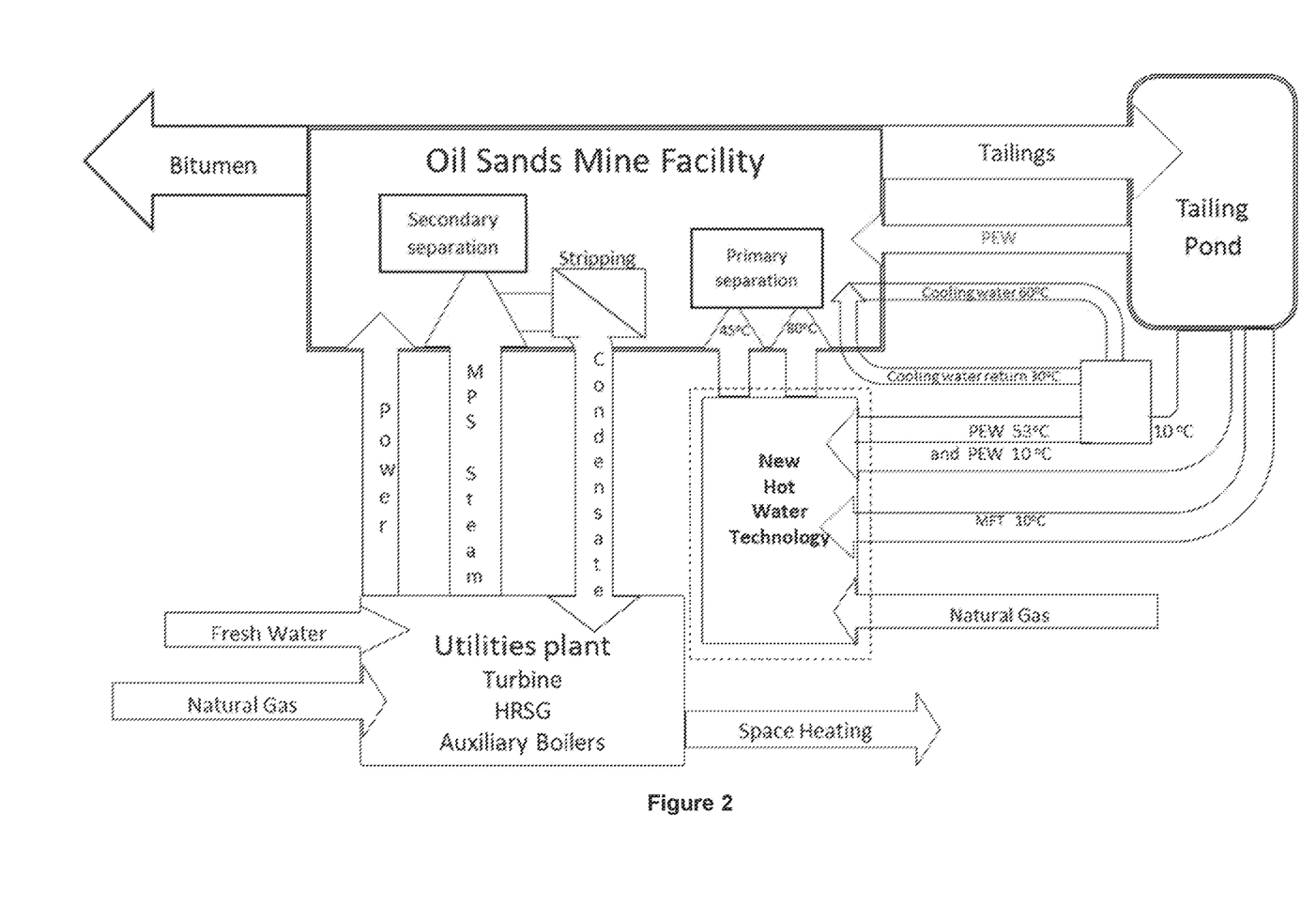
FIG. 2 is a schematic representation of an embodiment of a process of oil sands bitumen extraction according to the present invention.

FIG. 2 is a schematic representation of an embodiment of a process of oil sands bitumen extraction according to the present invention.

The process according to the present invention replaces the heat exchanger/steam boiler used in the existing technology (shown in FIG. 1 within the hatched box) and replaces the water heating function with a different process shown in FIG. 2 within the hatched box.

The new process uses a new hot water technology (shown in FIG. 2 within the hatched box) capable of using fuel and a high fraction of the mature fine tailings from the tailings pond while producing a dry tailing from that material.

Figure 3:
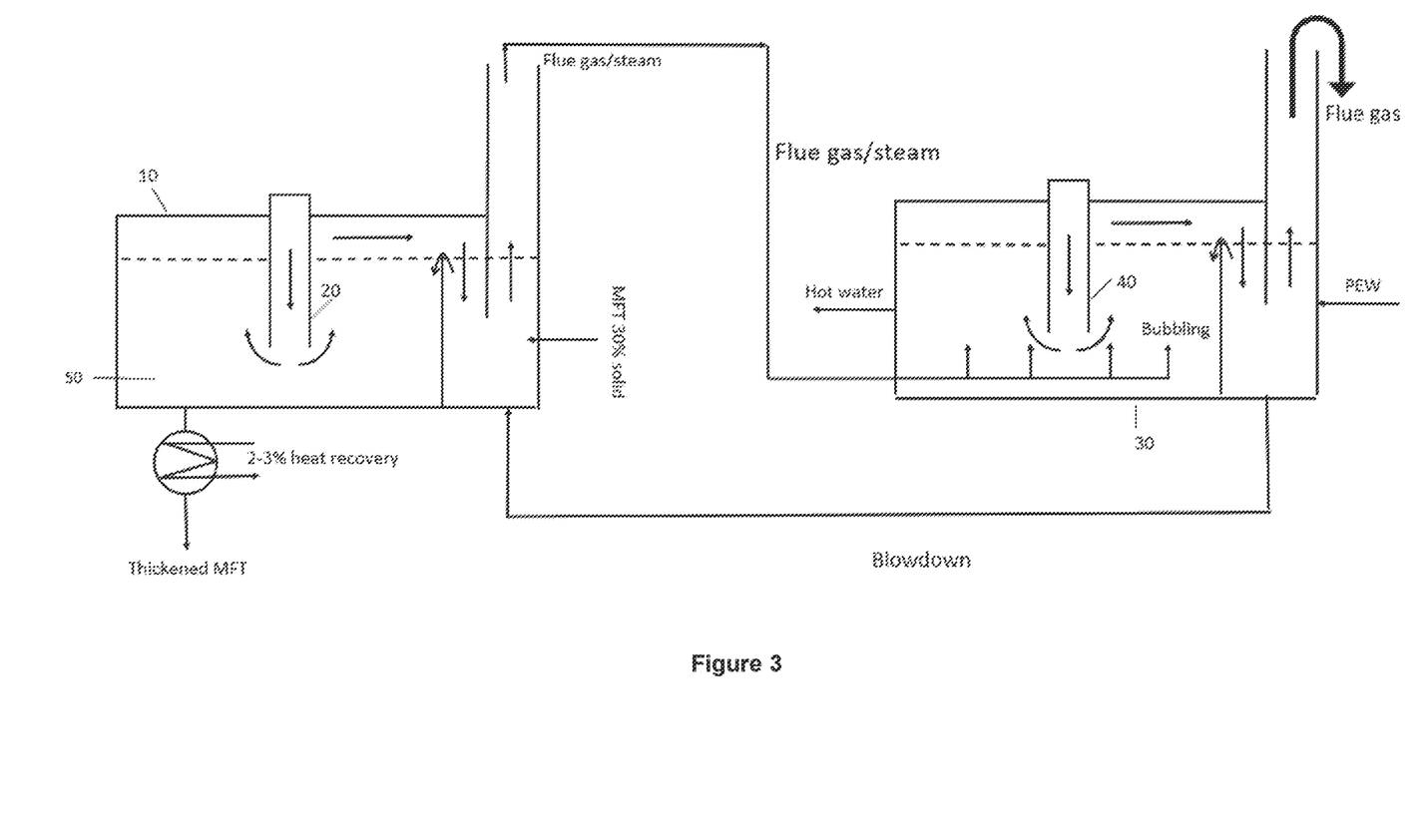
FIG. 3 is a schematic representation of an embodiment of a double stage submerged arrangement according to the present invention.

The following describes three embodiments of the invention depending on what is required by the process.
  1. For situations where less drying (dry to <50% solids) of mature fine tailings are required and no hydrocarbon destruction is needed, the double stage submerged arrangement as described in FIG. 3 is adequate. The limitation on drying is due to the need to keep the vessels from plugging and keep the slurry transportable as the water is removed past 50%.
  2. For situations where mature fine tailings are required to be dried from 50-100% solids and when there is a requirement to remove residual hydrocarbon, the flash submerged arrangement as described in FIG. 4 can be used. The disadvantage is that there may be increased carryover of solids to the hot water vessel and the arrangement will be slightly less efficient. This arrangement will be able to destroy hydrocarbon but will be unable to recover hydrocarbon/bitumen if that is a requirement.
  3. For situations where mature fine tailings are needed to be dried to 50-100% solids and when there is a requirement to both recover residual hydrocarbon and destroy any remaining residual hydrocarbon with the dry solid, the triple cascading arrangement as described in FIG. 5 is most suitable. This arrangement maximizes the contact between the flue gas and the mature fine tailings baths and therefore has the advantages of making each stage as efficient as possible and minimizing solids travelling towards the hot water vessel. This arrangement would also be best used in situations where hydrocarbon destruction is required in order to better remediate the dry solid stream.

All three arrangements have the option to use either air or oxy-firing for the fuel burners. The oxy-firing route will render a relatively pure $CO_2$ stream that is capable of being sequestered or utilized. This means that these technologies can all have near zero green house gas emissions.

Double Stage Submerged Arrangement

FIG. 3 is a schematic representation of an embodiment of the double stage submerged arrangement according to the present invention.

As shown in FIG. 3, this arrangement consists of equipment arranged in a unique configuration that benefits operations and the environment. It uses two submerged fuel burners 20 and 40 in tandem within two separate unit operations.

In the first stage, mature fine tailings have been pumped into a thickener vessel 10 from a tailing pond (not shown), the mature fine tailings have approximately 30% solids at 25° C. A fuel burner 20 is submerged in the thickener vessel 10. Fuel (natural gas, mostly $CH_4$) is introduced into the submerged fuel burner 20 which then through combustion produces a flue gas comprising mostly $CO_2$, $H_2O$ and nitrogen. The flue gas comes out of the bottom of submerged fuel burner 20 and bubbles through mature fine tailings bath 50 is used to evaporate water from within the mature fine tailings in a direct contact mode. The resulted more concentrated mature fine tailings are then discharged as a thick paste suitable for terrestrial sequestration or further processing. The amount of thickening of mature fine tailings is dictated by the need for the thickened slurry to flow and not accumulate in bottom of the thickener vessel 10 which will potentially plug the thickener vessel 10. Using mature fine tailings, the upper limit on thickening is approximately 50% solid and therefore if further drying is required the other arrangements as described below may be more suitable.

In the second stage, another fuel burner 40 is submerged within a hot water vessel 30, the submerged fuel burner 40 is used to heat water fed in from pond effluent water (PEW) from the tailing pond (not shown). The pond effluent water contains >99% $H_2O$. Meanwhile, the moisture in the flue gas/steam coming out from the thickener vessel 10 is also fed into the hot water vessel 30 to condense to liquid and recover its latent heat in heating the pond effluent water.

Mature fine tailings contain small amounts of bitumen that slipped through the system. This bitumen could be a valuable commodity. In the thickener vessel 10, as the mature fine tailings bath 50 is heated by the submerged fuel burner 20, some of the bitumen contained in the mature fine tailings will float to the top of the mature fine tailings bath 50. The mature fine tailings will stratify to produce relatively clean top water at the top and a heavier solid-rich layer towards the bottom. The floated bitumen along with the clearer top water can be skimmed. The remaining clearer top water can then be reintroduced into the hot water vessel 30 making the clearer top water part of the hot water to the primary separation process. In this manner, previously not captured bitumen contained in the mature fine tailings will also be added to the freshly mined bitumen, thereby increasing the overall bitumen recovery rate.

By placing the thickener vessel 10 and hot water vessel 30 in tandem, relatively pure $H_2O$ vapour generated in the thickener vessel 10 is fed through to the hot water vessel 30 and re-condensed, which increases the amount of clean water generated by the hot water vessel 30 by capturing both the evaporation from flue gas/steam from the thickener vessel 10 as well as the $H_2O$ generated from the combustion reaction. As well, it captures the latent heat in the flue gas/steam from the thickener vessel 10 and transfers the heat to the hot water vessel 30, improving overall energy consumption of the two-stage process.

Since the latent heat in the flue gas/steam from the thickener vessel 10 from the first stage is fully utilized within the process, the only losses from the system are radiant/convective losses from the surface of the vessels. This makes the invention much more energy efficient than the current existing processes. The simplicity and reduced size of this arrangement improve the economics of this process.

Pond Effluent Water (PEW) compared with the mature fine tailings contains very few solids. However, it does contain small amounts of solids that add to the solids loading through the entire bitumen mining process. By using the hot water vessel 30 to heat the pond effluent water solids contained in the pond effluent water will gather in the bottom of the hot water vessel 30. In the lower portions of the hot water vessel 30, where the solids are most likely to deposit, water will be drawn from these specific areas (called "blow-down" in FIG. 3). This process will transfer the solids once contained in the pond effluent water to the thickener vessel 10 where eventually the thickened solids are permanently removed from the system.

Although the double stage submerged arrangement can be done using air-fired systems, the operation can also be realized by using an oxy-firing mode, thus the exhaust gas will be highly concentrated $CO_2$, ready for sequestration or for use in any other industrial applications.

The submerged fuel burners 20, 40 are typically air fired. Air contains 79% $N_2$ and 21% $O_2$ by volume with some other very minor components. When hydrocarbon fuels such as fuel (mostly $CH_4$) are combusted, oxygen is consumed from the air to produce flue gas, so the overall reaction is as follows:

$$CH_4 + 2\ O_2 \text{ (from the air)} \rightarrow CO_2 + 2H_2O$$

The flue gas will comprise $CO_2$, $H_2O$ and nitrogen from the air. To use the flue gas sequestration some means (usually amine) would need to be used to separate the $N_2$ from the $CO_2$ in order to obtain a 100% $CO_2$ stream for sequestration ($H_2O$ can be removed simply by condensation).

With the option to be fired with straight $O_2$ (from an ASU), once the $H_2O$ is condensed, the flue gas is nearly 100% pure $CO_2$ and therefore capture ready by being pumped underground (sequestration).

The efficiency gain (and subsequent GHG/CAC reduction) of the present invention compared to the previous art are summarized in Table 1.

TABLE 1

Efficiency gain of the present invention compared to the current art of steam boiler/heat exchanger technology

|  | Existing Technology (using steam boiler/ heat exchanger) | Technology using present invention |
|---|---|---|
| Hot water produced (t/h) | 1,198.0 | 1,198.0 |
| Fuel Feed (GJ/h) | 354.5 | 310.5 |
| MFT feed (t/h) | — | 139.5 |
| Efficiency gain (%) | — | 12.4 |

As the mature fine tailings are processed, certain amounts of the water locked in the mature fine tailings is recovered, the water recycle rate in bitumen extraction plant is significantly improved.

Several scenarios for the water recycle rate have been tested. As the mature fine tailings are concentrated more with the present invention, the water recycle rate increases from the 80% range to more than 95%.

Flash Submerged Arrangement

Figure 4:
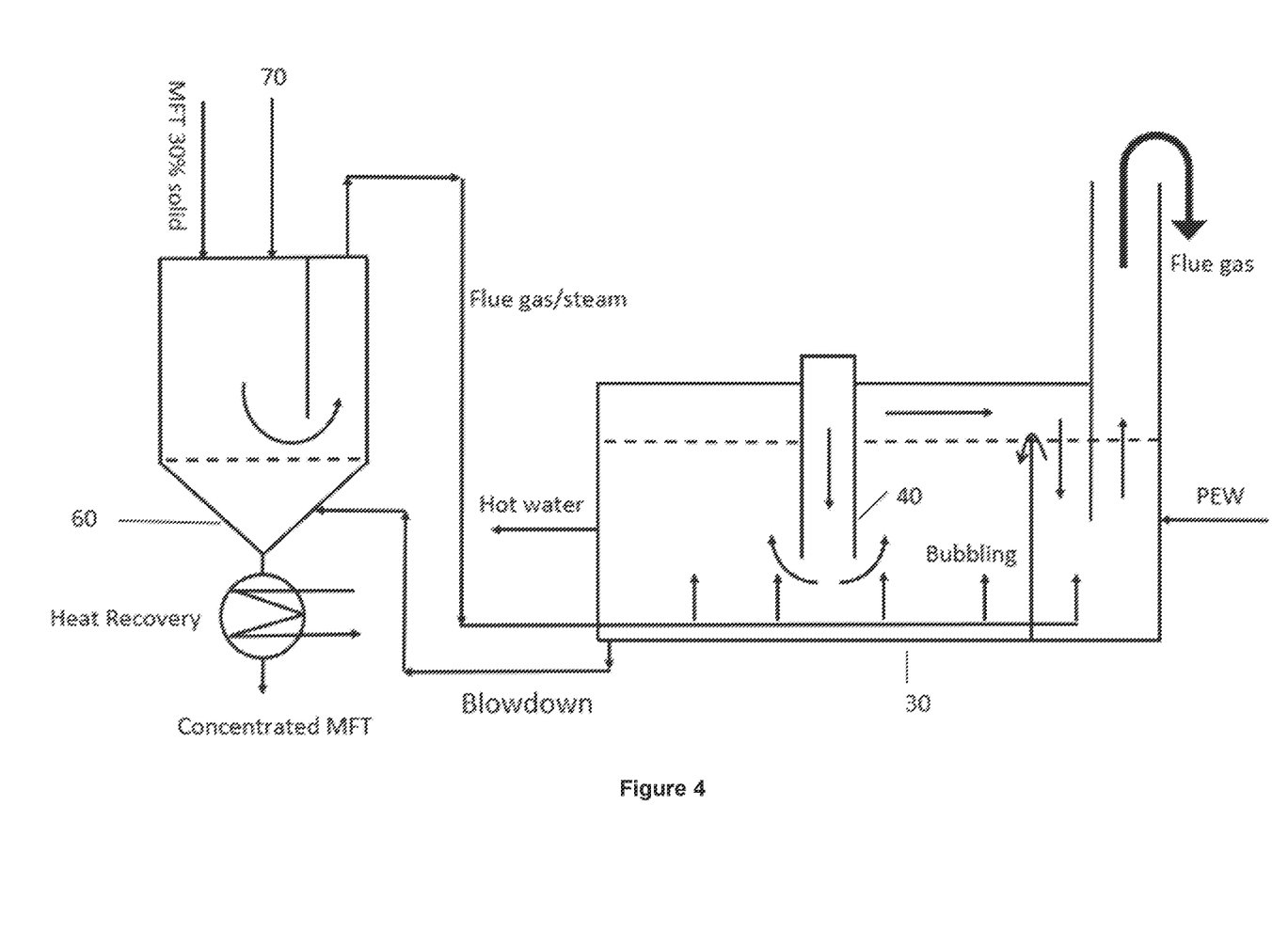
FIG. 4 is a schematic representation of an embodiment of a flash submerged arrangement according to the present invention.
Figure 5:
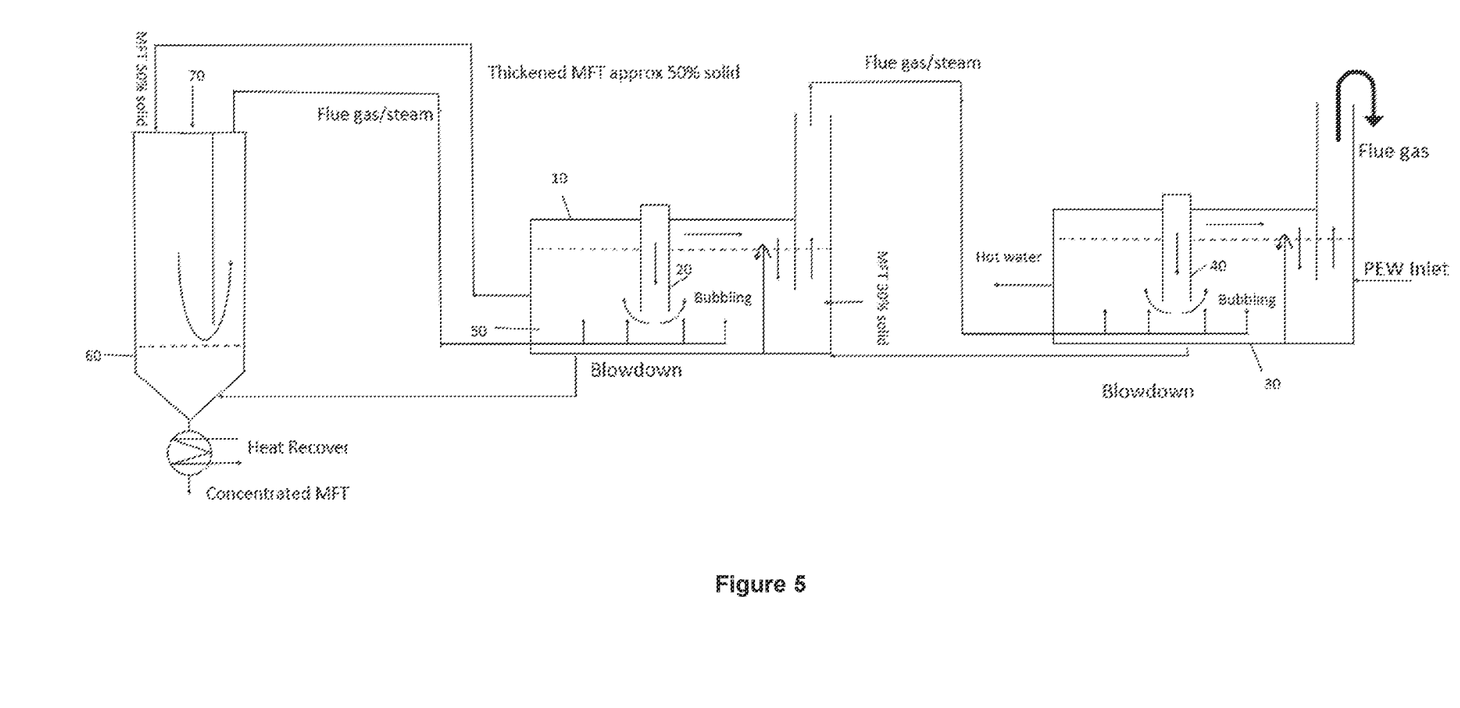
FIG. 5 is a schematic representation of an embodiment of triple cascading arrangement according to the present invention.

FIG. 4 is a schematic representation of an embodiment of a flash submerged arrangement according to the present invention.

As the mature fine tailings thicken, their viscosity increases, making them prone to solidifying causing plugging. It also becomes more problematic to pump the mature fine tailings using the conventional technology.

For situations where mature fine tailings are required to be dried to 50-100% solids and when there is a requirement to remove residual hydrocarbon from the concentrated mature fine tailings stream, the flash submerged arrangement may be more suitable.

Referring to FIG. 4, the flash submerged arrangement uses the two stage arrangement; however, in this arrangement, during the first stage, mature fine tailings, pumped from a tailing pond (not shown), with approximately 30% solids at 25° C., are sprayed into a flash concentrator vessel 60, as opposed to using the submerged fuel burner 20 during the first stage in the double stage submerged arrangement. This process may be useful in situations where the mature fine tailings prove to be too viscous to be penetrated by the submerged fuel burner or should the frothing induced by the bitumen contained within the mature fine tailings prove to be more than can be adequately managed within the flash concentrator vessel. The spray drying approach may also allow the bitumen (hydrocarbon) contained within the mature fine tailings to reach higher temperatures and thereby be burnt and consumed within the process.

Within the flash submerged arrangement, mature fine tailings are sprayed into the flash concentrator vessel 60 near a burner or series of burners 70 to supply the required heat. A baffle divides the flash concentrator vessel 60 so as to minimize the opportunity of the flue gas to short circuit the system and become underutilized. Multiple mature fine tailings nozzles can also be installed in the flash concentrator vessel 60 for a larger scale application. The exhaust gas (flue gas) resulted from a burner or series of burners 70 near the flash concentrator vessel 60 needs to be kept over approximately 650° C. in order to destroy any residual hydrocarbon if that is a requirement.

The mature fine tailings slurry will most likely be preheated with the flue gas/steam exhaust from the flash concentrator vessel 60. The mature fine tailings slurry would be sprayed in through a nozzle or series of nozzles near the top of the flash concentrator vessel 60.

The bottom of the flash concentrator vessel 60 provides volume for the concentrated solids to accumulate and facilitates its continuous removal from the system.

Solids are removed from the bottom of the flash concentrator vessel 60 by using gravity and mechanical means, such as being pumped, augured, etc.

The flash concentrator vessel 60 can be elevated to allow for disposal vehicles to be loaded beneath it.

In the second stage, a fuel burner 40 is submerged within a hot water vessel 30, the submerged fuel burner 40 is used to heat water fed in from pond effluent water (PEW) from the tailing pond (not shown). The pond effluent water contains >99% $H_2O$. Meanwhile, the moisture in the flue gas/steam coming out from the flash concentrator vessel 60 is fed into the hot water vessel 30 to condense its moisture to liquid and recover its latent heat in heating the pond effluent water.

The flue gas from the flash concentrator vessel 60 would be mostly steam as in the double stage submerged arrangement. The hot water vessel 30 would be similar to what is in the double stage submerged arrangement (except that a baffle is added to reduce the short circuiting). Blowdown (with solids) from the hot water vessel 30 in a similar manner to the double stage submerged arrangement would be added to the flash concentrator vessel 60.

Spray dryers by their very nature produce fine particulate that will travel out of the flue gas pipe. This means a dust collection is usually required. The flash submerged arrangement takes the flue gas and bubbles it through the hot water vessel 30, equivalent to using a scrubber. Dust in the exhaust will fall to the bottom of the hot water vessel 30 and be removed by the blowdown.

The disadvantage of the flash submerged arrangement is that there may be increased carryover of solids to the hot water vessel 30 and the arrangement will be slightly less efficient. Since flue gas/steam is fed into the hot water vessel 30, solids carryover will be transferred to the hot water vessel 30. Should further solids removal be required, a dust collecting cyclone can be installed in between the flash concentrator vessel 60 and the hot water vessel 30. The flash submerged arrangement will be able to destroy hydrocarbon but be unable to recover hydrocarbon using a skimming operation if that is a requirement.

If the mature fine tailings are dried fully, water locked in the mature fine tailings is 100% recovered, and the process energy efficiency is pushed to the highest possible level. Also dry powder is easier to be transported away for disposal.

The flash submerged arrangement is not conducive to skimming residual bitumen from the process in the same manner as the other arrangements.

Triple Cascading Arrangement

FIG. 5 is a schematic representation of an embodiment of the triple cascading arrangement according to the present invention.

For situations where the mature fine tailings are needed to be dried to 50-100% solids and when there is a requirement to recover residual hydrocarbon and destroy any remaining hydrocarbon in the dried solid, the triple cascading arrangement is most suitable.

In the triple cascading arrangement, a flash concentrator vessel 60, a thickener vessel 10 and a hot water vessel 30 are arranged sequentially in a three-stage process. The hot water vessel 30 in the triple cascading arrangement behaves similarly to that described in the double submerged arrangement. The thickener vessel 10 behaves similarly to the thickener vessel 10 in the double submerged arrangement, except that the thickener vessel 10 also receives hot flue gas from the flash concentrator vessel 60 that is bubbled through the mature fine tailings bath 50. The thickened mature fine tailings from the thickener vessel are pumped into the flash concentrator vessel 60.

Referring to FIG. 5, mature fine tailings have been pumped into a thickener vessel 10 from a tailing pond (not shown), the mature fine tailings have approximately 30% solids at 25° C. A fuel burner 20 is submerged in the thickener vessel 10. Fuel (mostly $CH_4$) is introduced into the submerged fuel burner 20 which then through combustion produces a flue gas comprising $CO_2$, $H_2O$ and nitrogen. The flue gas comes out of the bottom of submerged fuel burner 20 and bubbles through mature fine tailings bath 50 is used to evaporate water from within the mature fine tailings in a direct contact mode.

The resulted more concentrated mature fine tailings (50% solid) are then pumped and sprayed into a flash concentrator vessel 60 near a burner or series of burners 70 to supply the required heat. A baffle divides the flash concentrator vessel 60 so as to minimize the opportunity of the flue gas to short circuit the system and become underutilized. Multiple mature fine tailings nozzles can also be installed in the flash concentrator vessel 60 for a larger scale application. The exhaust gas (flue gas) resulted from a burner or series of burners 70 near the flash concentrator vessel 60 needs to be kept over approximately 650° C. in order to destroy any residual hydrocarbon if that is a requirement.

A fuel burner 40 is submerged within a hot water vessel 30, the submerged fuel burner 40 is used to heat water fed in from pond effluent water (PEW) from the tailing pond (not shown). The pond effluent water contains >99% $H_2O$. Meanwhile, the moisture in the flue gas/steam coming out from the thickener vessel 10 is also fed into the hot water vessel 30 to condense its moisture to liquid and recover its latent heat in heating the pond effluent water.

Meanwhile, the thickener vessel 10 also receives hot flue gas/steam from the flash concentrator vessel 60 that is bubbled through the mature fine tailings bath 50. Blowdown (with solids) from the hot water vessel 30 in a similar manner to the double stage submerged arrangement and similar to the flash submerged arrangement would be added to the flash concentrator vessel 60.

There is the option to skim residual bitumen from the thickener vessel 10 and reintroduce the residual bitumen and hot water from the skimming operation back into the hot water vessel.

Should further solids removal be required, a dust collecting cyclone can be installed in between the flash concentrator vessel 60 and the thickener vessel 30.

Within the flash concentrator vessel 60, thickened mature fine tailings slurry is sprayed in near (or part of) a burner or a series of burners 70. The mature fine tailings fall down through the flash concentrator vessel 60 while evaporation is taking place. By operating the flash concentrator vessel 60 at various temperatures, different levels of drying can be achieved. Operating at higher temperatures will oxidize and destroy the hydrocarbon remaining in the sand which may be desirable depending upon how the sand is used or stored after this process.

Solids are removed from the bottom of the flash concentrator vessel 60 by using gravity and/or mechanical means, such as being pumped, augured, etc. The flash concentrator vessel 60 can be elevated to allow for disposal trucks to be loaded beneath it.

Multiple mature fine tailings spray nozzles and burners can also be installed into each vessel for a larger scale application.

The triple cascading arrangement maximizes the contact between the flue gas and the mature fine tailings baths and therefore has the advantages of making each stage as efficient as possible and minimizing the solids travelling towards the hot water vessel.

The triple cascading arrangement would also be best used in situations where both hydrocarbon recovery and residual hydrocarbon destruction is required in order to better remediate the dry solid stream.

In all three arrangements, where a fuel burner, an injector or spray is used, a plurality or a series of fuel burners, injectors and sprays may be used depending on the scale of the processes. A burner could also contain a spray as an integral part thereof.

The above-described processes are also suitable for treating the other high solid streams such as fluid fine tailings (FFTs) within the bitumen process, which tend to be smaller intermediary stream that are formed within the process before the streams are sent to the tailings ponds.

There are many examples of high solids effluent streams with other industrial applications. Examples of these include:

Tailings from Mining Operations
High solid blowdown streams
Sludge from pulp and paper, municipal solid waste, etc.
Red mud from the aluminum industry
Wastewater from other industries The processes described in the present application are applicable to these industries.

The invention claimed is:

1. A method for producing water for primary extraction in an oil sands bitumen extraction process using mature fine tailings, the method comprises steps of:
   pumping mature fine tailings from a tailing pond into a thickener vessel to form a mature fine tailings bath within the thickener vessel,
   introducing fuel into a first fuel burner disposed within in the thickener vessel and submerged in the mature fine tailings bath,
   combusting the fuel using the first fuel burner to produce a first flue gas,
   evaporating water from within the mature fine tailings bath within the thickener vessel by bubbling the first flue gas through the mature fine tailings bath, thereby producing a first flue gas/steam and concentrated mature fine tailings,
   discharging the concentrated mature fine tailings from the thickener vessel for further processing or disposal,
   supplying pond effluent water from the tailing pond to a hot water vessel to form a pond effluent water bath within the hot water vessel,
   heating the pond effluent water bath using a second fuel burner submerged in the pond effluent water, and
   bubbling the first flue gas/steam through the pond effluent water bath in the hot water vessel to condense moisture in the first flue gas/steam and recover heat from the first flue gas/steam into the pond effluent water bath.

2. The method according to claim 1, wherein during the evaporating of water from the mature fine tailings bath, bitumen contained in the mature fine tailings floats to a top of the mature fine tailings bath forming a floated bitumen, the method further comprising skimming the floated bitumen to recover said floated bitumen.

3. The method according to claim 1, wherein during the evaporating of water from the mature fine tailings bath, bitumen contained in the mature fine tailings floats to a top of the mature fine tailings bath forming a remaining water and a floated bitumen which floats atop the remaining water, the method further comprising a step of introducing blowdown water from the hot water vessel to the thickener vessel.

4. The method according to claim 1, wherein the mature fine tailings to be fed into the thickener vessel have about 30% solids at 25° C.

5. The method according to claim 1, wherein the first fuel burner and the second fuel burner are fired through air combustion or oxy-combustion, and wherein the fuel is a solid, liquid or gaseous hydrocarbon, hydrogen, or a mixture thereof.

6. A method for producing water for primary extraction in an oil sands bitumen extraction process using mature fine tailings, wherein the method comprises steps of:
   pumping and spraying mature fine tailings from a tailing pond into a flash concentrator vessel,
   introducing fuel into a first fuel burner,
   combusting the fuel using the first fuel burner to produce a first flue gas,
   introducing the first flue gas into the flash concentrator vessel to heat and evaporate a portion of the mature fine tailings sprayed into the flash concentrator vessel, thereby producing concentrated mature fine tailings and a first flue gas/steam, discharging the concentrated mature fine tailings from the flash concentrator vessel for further processing or disposal, supplying pond effluent water from the tailing pond to a hot water vessel to form a pond effluent water bath within the hot water vessel, heating the pond effluent water bath using a second fuel burner submerged in the pond water effluent bath, and bubbling the first flue gas/steam through the pond effluent water bath in the hot water vessel to condense moisture in the first flue gas/steam and recover heat from the first flue gas/steam into the pond effluent water bath.

7. The method according to claim 6, wherein the flash concentrator vessel comprises a baffle which divides an interior portion thereof, thereby lengthening a flow path of the first flue gas through the flash concentrator vessel, the method further comprising introducing blowdown water from the thickener vessel to the flash concentrator vessel.

8. The method according to claim 6, wherein the first flue gas is maintained at a temperature above 650° C. at least in order to destroy any residual hydrocarbon.

9. The method according to claim 6, wherein the flash concentrator vessel is elevated to allow a disposal vehicle to be positioned below the flash concentrator vessel such that waste can be loaded from the flash concentrator vessel into the disposal vehicle.

10. The method according to claim 6, wherein the mature fine tailings to be fed into the flash concentrator vessel have about 30% solids at 25° C.

11. The method according to claim 6, wherein the first fuel burner and the second fuel burners are fired with air combustion or oxy-combustion, and wherein the fuel is a solid, liquid or gaseous hydrocarbon, hydrogen, or a mixture thereof.

12. A method for producing water from primary extraction in an oil sands bitumen extraction process using mature fine tailings, the method comprises steps of:

pumping mature fine tailings from a tailing pond into a thickener vessel to form a mature fine tailings bath within the thickener vessel, introducing fuel into a first fuel burner disposed within in the thickener vessel and submerged in the mature fine tailings bath, combusting the fuel using the first fuel burner to produce a first flue gas, evaporating water from within the mature fine tailings within the thickener vessel by bubbling the first flue gas through the mature fine tailings bath, thereby producing a first flue gas/steam and a first concentrated mature fine tailings, supplying pond effluent water from the tailing pond to a hot water vessel to form a pond effluent water bath within the hot water vessel, heating the pond effluent water bath using a second fuel burner submerged in the pond effluent water bath, bubbling the first flue gas/steam through the pond effluent water bath in the hot water vessel to condense moisture in the first flue gas/steam and recover heat from the first flue gas/steam into the pond effluent water bath, pumping and spraying the resulted first more concentrated mature fine tailings from the thickener vessel into a flash concentrator vessel, introducing fuel into a third fuel burner, combusting the fuel using the third fuel burner to produce a second flue gas, introducing the second flue gas into the flash concentrator vessel to heat and evaporate a portion of the mature fine tailings sprayed into the flash concentrator vessel, thereby producing a second concentrated mature fine tailings and a second flue gas/steam, discharging the second concentrated mature fine tailings from the flash concentrator vessel for further processing or disposal, and bubbling the second flue gas/steam through the mature fine tailings bath in the thickener vessel.

13. The method according to claim 12, wherein the flash concentrator vessel comprises a baffle which divides an interior portion thereof, thereby lengthening a flow path of the second flue gas through the flash concentrator vessel.

14. The method according to claim 12, wherein a plurality of nozzles is installed in or near a top of the flash concentrator vessel to spray the first concentrated mature fine tailings into the flash concentrator vessel.

15. The method according to claim 12, wherein the second flue gas is maintained at a temperature above 650° C. at least in order to destroy any residual hydrocarbon.

16. The method according to claim 12, wherein the flash concentrator vessel is elevated to allow a disposal vehicle to be positioned below the flash concentrator vessel such that waste can be loaded from the flash concentrator vessel into the disposal vehicle.

17. The method according to claim 12, wherein during the evaporating of water from the mature fine tailings bath in the thickener vessel, bitumen contained in the mature fine tailings floats to a top of the mature fine tailings bath forming a floated bitumen, the method further comprising skimming the floated bitumen is skimmed to recover said floated bitumen.

18. The method according to claim 12, wherein during the evaporating of water from the mature fine tailings bath in the thickener vessel, bitumen contained in the mature fine tailings floats to a top of the mature fine tailings bath forming a remaining water and a floated bitumen which floats atop the remaining water, the method further comprising a step of introducing blowdown water from the hot water vessel to the thickener vessel, and from the thickener vessel into the flash concentrator vessel.

19. The method according to claim 12, wherein the mature fine tailings to be fed into the thickener vessel have about 30% solids at 25° C.

20. The method according to claim 12, wherein the first fuel burner and the second fuel burners are fired with air combustion or oxy-combustion, and wherein the fuel is a solid, liquid or gaseous hydrocarbon, hydrogen, or a mixture thereof.

* * * * *